(12) United States Patent
Boscolo Berto et al.

(10) Patent No.: US 9,947,350 B1
(45) Date of Patent: Apr. 17, 2018

(54) METHOD OF DETECTING BACK ELECTROMOTIVE FORCE IN ELECTRO-MECHANICAL ACTUATORS, CORRESPONDING DEVICE AND APPARATUS

(71) Applicant: STMicroelectronics S.R.L., Agrate Brianza (IT)

(72) Inventors: Michele Boscolo Berto, Sesto San Giovanni (IT); Ezio Galbiati, Agnadello (IT); Giuseppe Maiocchi, Villa Guardia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/636,426

(22) Filed: Jun. 28, 2017

(30) Foreign Application Priority Data

Dec. 16, 2016 (IT) .................. 102016000127455

(51) Int. Cl.
*G11B 5/55* (2006.01)
(52) U.S. Cl.
CPC .......... *G11B 5/5534* (2013.01); *G11B 5/5547* (2013.01); *G11B 5/5565* (2013.01)
(58) Field of Classification Search
CPC ......... G11B 5/54–5/55; G11B 5/5521–5/5586; G11B 5/596–5/59611; G11B 5/59694; G11B 21/10–21/12
USPC ... 360/55, 69, 75, 77.01–77.08, 78.04–78.14
See application file for complete search history.

(56) References Cited

U.S. PATENT DOCUMENTS

| | | | |
|---|---|---|---|
| 6,542,324 B1 | 4/2003 | Galbiati et al. | |
| 7,215,094 B2 | 5/2007 | Maiocchi et al. | |
| 7,486,039 B2 | 2/2009 | Berto | |
| 7,576,939 B2* | 8/2009 | Ooi ...................... | G11B 5/5526 360/75 |
| 7,649,330 B2* | 1/2010 | Yamashita ............. | G11B 21/12 360/75 |
| 7,710,678 B2* | 5/2010 | Kokami ............... | G11B 5/5526 360/75 |
| 7,728,539 B2* | 6/2010 | Smith .................. | G11B 5/5526 318/400.3 |
| 7,800,855 B2* | 9/2010 | Kuramoto ............. | G11B 5/553 360/75 |

(Continued)

*Primary Examiner* — Wayne Young
*Assistant Examiner* — James L Habermehl
(74) *Attorney, Agent, or Firm* — Seed IP Law Group LLP

(57) ABSTRACT

A driver device coupled to a winding of an electro-mechanical actuator includes: a power stage driving the winding in a discontinuous mode by alternating conduction on-phases to off-phases, and a sensor circuit sensing a voltage across the winding in an off-phase, wherein, during such an off-phase the voltage across the winding includes a residual voltage which decays to zero. The power stage drives the winding from an on-phase to an off-phase by applying to the winding a reverse current pulse to invert the direction of flow of the current through the winding and produce an oscillation of the residual voltage, whereby the residual voltage includes a zero-crossing point after the current through the winding is exhausted. The sensor circuit senses the voltage across the winding at this zero-crossing point, whereby the voltage sensed across the winding at the zero-crossing point is indicative of the back electromotive force of the winding.

15 Claims, 4 Drawing Sheets

(56) References Cited

U.S. PATENT DOCUMENTS

| | | | | |
|---|---|---|---|---|
| 7,848,044 B2 * | 12/2010 | Kokami | ............... | G11B 5/5526 |
| | | | | 360/75 |
| 7,902,778 B2 * | 3/2011 | Yamashita | ............. | G11B 21/12 |
| | | | | 360/75 |
| 8,294,400 B2 * | 10/2012 | Harmer | .................. | G11B 21/12 |
| | | | | 318/400.34 |
| 8,970,151 B2 * | 3/2015 | Vinay | ................. | H02P 23/0004 |
| | | | | 318/400.04 |
| 9,121,753 B2 * | 9/2015 | Cahill | .................... | G01H 13/00 |
| 9,153,248 B1 * | 10/2015 | Contreras | .............. | G11B 5/022 |
| 2005/0157418 A1 | 7/2005 | Galbiati | | |
| 2010/0067140 A1 * | 3/2010 | Yamashita | ............. | G11B 21/12 |
| | | | | 360/75 |

* cited by examiner

METHOD OF DETECTING BACK ELECTROMOTIVE FORCE IN ELECTRO-MECHANICAL ACTUATORS, CORRESPONDING DEVICE AND APPARATUS

BACKGROUND

Technical Field

The description relates to the sensing of back electromotive force (BEMF) in electro-mechanical actuators.

One or more embodiments can be applied, for example, to the control of electro-mechanical actuators (motors) such as "voice coil motors" (VCMs) in hard disk drives (HDDs) of computers.

Description of the Related Art

An important factor in HDD applications is represented by the control of the voice coil motor.

Such a name, which originally identifies the winding intended to move the cone of an electrodynamic loudspeaker, is currently used to identify the electromagnetic actuators (substantially linear electrical motors) used to move the heads of HDD units during read/write (track following) phases and again during loading phases of the head (or heads) onto the surface of the disk and during the parking (or unloading) phase; in modern HDD units, during phases of inactivity, the heads can be parked on a ramp positioned externally to the disk.

In these types of HDD, speed control during head loading and parking phases takes on particular importance.

For controlling the speed during loading and unloading, as indicator of the VCM speed it is possible to use the back electromotive force (BEMF), as BEMF and speed are related by a direct proportionality relationship.

The BEMF can be measured, for example:

using a dedicated circuit, capable of extracting the BEMF, even in the presence of current flowing through the VCM (ramp load/unload in continuous mode), or by measuring the voltage across the VCM, through which, by cutting off the power stage, the current is temporarily cancelled (ramp load/unload in discontinuous mode).

It is found that, although it can be produced more simply and economically than continuous ramp load/unload, discontinuous ramp load/unload can be subject to some limitations related to the residual voltage present across the VCM even in the absence of current flowing through the same VCM. This residual voltage can result in a transient voltage disturbance with a rather slow discharge time constant (from a few tens to a few hundreds of microseconds) so as to limit the maximum frequency of operation of the discontinuous control.

The limited frequency of operation of the discontinuous control can negatively affect the bandwidth of the speed control loop, the speed ripple of the VCM and the controllable average current through the winding of the VCM.

The documents U.S. Pat. No. 7,215,094 B2 and U.S. Pat. No. 7,486,039 B2 are illustrative of the prior art.

BRIEF SUMMARY

An aim of one or more embodiments is to contribute to further improving the known solutions.

One or more embodiments can relate to a corresponding device and a corresponding apparatus (for example, a hard disk drive—HDD).

The claims form an integral part of the technical teaching provided here with regard to the embodiments.

One or more embodiments can provide for generating an oscillation of known characteristics of the same residual voltage with sampling of the voltage across the load at or close to a (first) zero-crossing of the oscillation after the current through the load is exhausted.

One or more embodiments can exploit the fact that the zero-crossing of the residual voltage takes place over (much) faster times than those required for the natural extinction of the residual voltage; this provides for using power stage cutoff times that are reduced compared with the prior art to the benefit of the average value of the controllable current through the load and of the general performance of the system.

One or more embodiments can improve the performance of the discontinuous ramp load/unload procedure either from the speed control perspective (bandwidth and ripple), or from the perspective of the controllable average current through the load.

The latter factor can play an important role, for example under emergency conditions in which it is desirable that the heads of the HDD can be parked in the absence of an external power supply, exploiting for example the limited energy stored by the rotating motor spindle (referred to as "emergency retract").

BRIEF DESCRIPTION OF THE SEVERAL VIEWS OF THE DRAWINGS

One or more embodiments will now be described, purely by way of non-limiting example, with reference to the accompanying figures, in which.

DETAILED DESCRIPTION

In the description that follows, one or more specific details are illustrated with the aim of providing an in-depth understanding of the examples of the embodiments of this description. The embodiments can be obtained without one or more of the specific details, or using other methods, components, materials, etc. In other cases, operations, materials or known structures are not illustrated or described in detail such that certain aspects of the embodiments will be made clear.

Reference to "one embodiment" within the framework of the present description is intended to indicate that a particular configuration, structure, characteristic described with reference to the embodiment is included in at least one embodiment. Therefore, phrases like "in one embodiment" which can be present in one or more points of the present description do not necessarily refer specifically to the same embodiment. Furthermore, particular shapes, structures or characteristics can be combined in any suitable manner in one or more embodiments.

The references used here are provided simply for convenience and therefore do not define the scope of protection or the importance of the embodiments.

Figure 1:
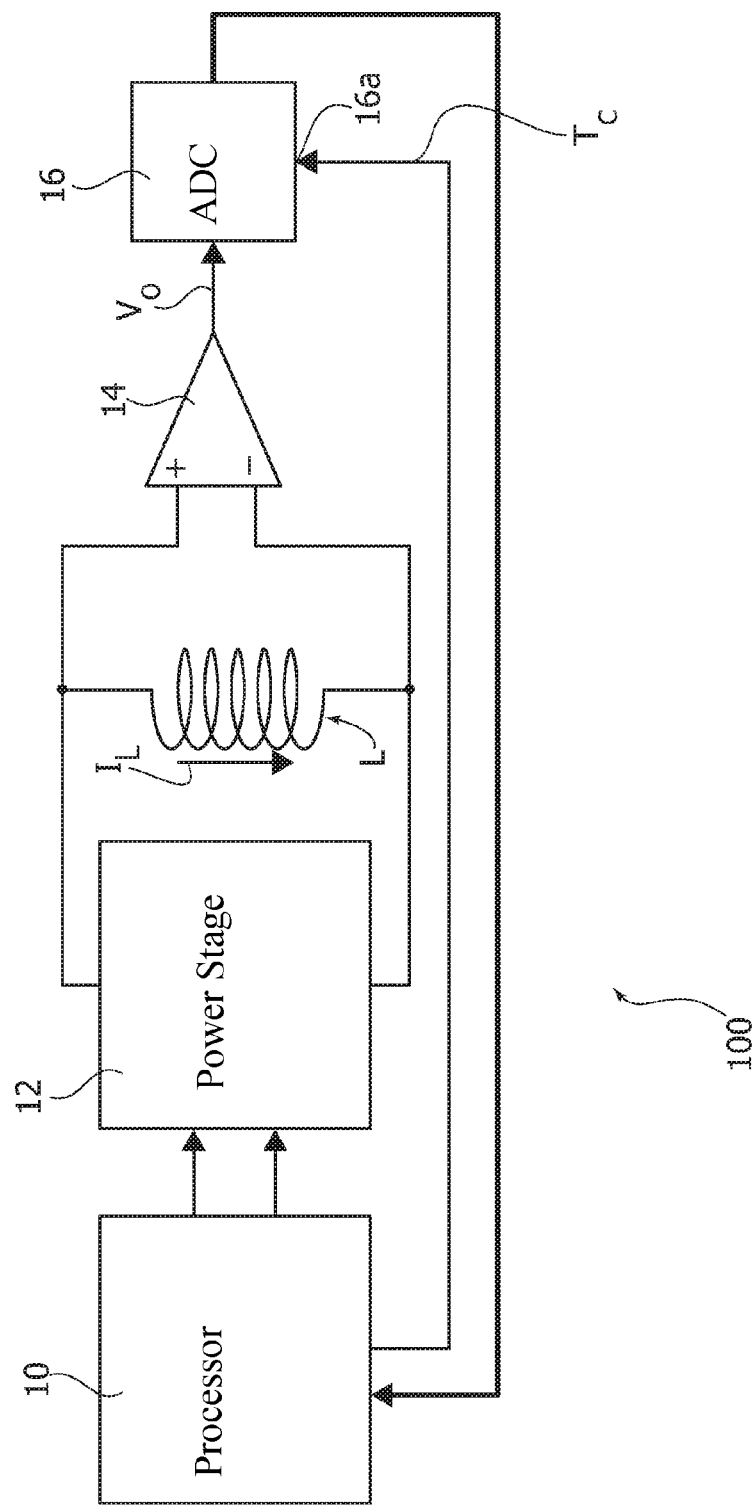
FIG. 1 is an example block diagram of a control device capable of using one or more embodiments, FIGS. 2 and 3 exemplify possible operational modes of such a device, FIG. 4 exemplifies possible operational modes of a device according to one or more embodiments.

The diagram of FIG. 1 can be viewed as being generically illustrative of an apparatus 100 in which there is present, as supplied load L, an electro-mechanical actuator (electric motor).

This could be, for example, a hard disk drive (HDD) for a computer in which there is present, as load L, a "voice coil motor" (VCM), represented schematically here in the form of a winding.

It will therefore be appreciated that the actuator L can form a distinct element per se (in particular a driven external load) with respect to the embodiment.

One or more embodiments can be applied to situations in which discontinuous control of the actuator L is achieved.

To this end, provision can be made for the load (i.e., for example, the actuator L) to be driven by a power stage 12 capable of generating a current $I_L$ intended to flow through the load L.

A ramp load/unload function (for example, in an HDD unit 100) conducted in a discontinuous mode, as described previously, can specify a cutoff phase TOFF (see FIGS. 2 to 4, which will be returned to more extensively hereinafter) in which the current $I_L$ through the load (for example, the actuator) L is cancelled, with the value of the voltage across the load L sensed, for example by means of a differential amplifier 14 (for example, an operational amplifier). The output $V_O$ of the amplifier 14 can be made available, after possible conversion to digital by means of an analog-digital converter (ADC) 16, to a processor circuit 10, such as for example a microprocessor.

The circuit 10 (which is capable of activating the conversion action by means of a trigger signal $T_C$ supplied to the converter 16 on an input 16a) can provide an estimate of the speed of rotation of the motor, for example by deducing it from the differential voltage (BEMF) across the load L, so as to be able to produce a corresponding control action by driving (modulating) the current $I_L$ through the load L.

For example, in HDD applications, the loading phase of the heads onto the surface of the disk (ramp loading) and the parking (unloading) phase can be performed at a controlled speed so as to preserve the integrity of those heads and of the surface of the disk. The speed can be deduced by extrapolating or directly measuring the BEMF value generated by the movement of the VCM (i.e., of the load L in the diagram of FIG. 1).

In the case of "continuous" type control, already referred to previously, the BEMF can be extrapolated by means of a reconstruction circuit based on operational amplifiers which reconstruct the BEMF even in the presence of current flowing through the load.

In the case of discontinuous control, also already discussed previously, the measurement of the BEMF can be performed directly by sampling the voltage across the VCM which turns out to be (virtually) equal to the BEMF, the current $I_L$ through the load L being zero. The discontinuous control can be hence achieved by staggering conduction periods TON with cutoff periods TOFF of the current through the load and by sampling the voltage across the load L during the cutoff phases. This can take place for example as indicated schematically in FIG. 1, i.e., by means of the circuit 16 (ADC converter) capable of being to this end driven by the processor circuit 10.

In general terms, and without prejudice to that stated in greater detail hereinafter, the possible operational criteria discussed previously are to be considered on the whole as being known, and therefore such that they do not require a detailed description here.

Figure 2:
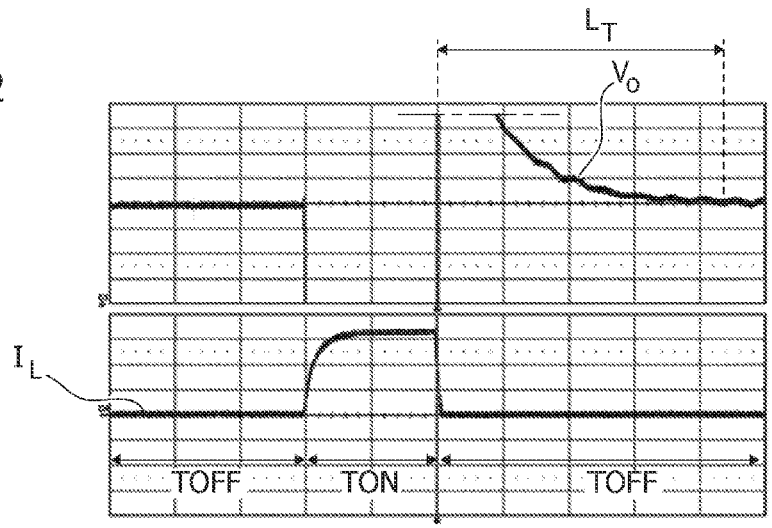

For example, FIG. 2 illustrates, in the bottom graph, a possible pattern of the current $I_L$ flowing through the load, i.e., through the motor L, and, in the top graph, a corresponding possible pattern of the voltage across the same load L in a control system such as the one represented in FIG. 1, in a solution in which provision is made for the pulses of current $I_L$ to be generated simply by alternating conduction periods TON with cutoff periods TOFF.

The voltage across the load L of interest for the purposes of sensing the BEMF is (only) that present during the cutoff period TOFF; the voltage across the load L during the period TON (not visible in the figure since it is off the scale) does not bring informative content in relation to the BEMF since it corresponds to the voltage applied by the power stage 12.

The graph of FIG. 2 refers to a situation in which it is assumed that the load L (for example, a VCM actuator) is kept blocked for the purposes of highlighting a possible pattern of the voltage across it without components derived from its speed (BEMF); obviously, such a blocked actuator situation is not intended to arise during normal operation of the actuator.

With such a solution, the voltage across the load L is not cancelled instantaneously upon cancellation of the current $I_L$, and a residual voltage $V_O$ can be present for a certain time duration across the load (for example, VCM), which voltage becomes zero only after a certain time interval. By adopting a control solution of this type, in an actuator (for example, VCM) that is free to move, and therefore free to generate BEMF voltage, before being able to perform sampling of the BEMF it may therefore be necessary to wait for the residual voltage $V_O$ to become depleted naturally. This causes a corresponding (minimum) latency time, indicated in FIG. 2 by $L_T$ (minimum ADC sampling latency), before, for example, the circuit 10 can send the signal $T_C$ to the converter 16.

As stated at the start of this description, the discontinuous control of the VCM of an HDD unit is of simpler and more economical implementation than continuous control; the phenomenon of the residual voltage described just now with reference to FIG. 2 can however limit its performance. The residual voltage across the load is added to the BEMF voltage, and this can reduce the precision of the speed estimate.

To avoid incurring errors due to the presence of the residual voltage, it is possible to use a cutoff time TOFF that is (much) longer than the time required for the cancellation of the current, so as to allow the residual voltage $V_O$ to become depleted naturally. However this involves, for the reasons viewed above, a reduction in the frequency of operation of the discontinuous control with negative effects from the perspective of the speed control bandwidth, the VCM speed ripple and the controllable average current through the VCM.

In other words, the latency $L_T$ between the end of the energizing phase TON and the sampling of the voltage across the load L can negatively affect the operation of the apparatus 100.

The documents U.S. Pat. No. 7,215,094 B2 and U.S. Pat. No. 7,486,039 B2 (already cited) address the problem of preventing the negative effects generated by the use of long cutoff times.

For example, in the document U.S. Pat. No. 7,486,039 B2, the residual voltage $V_O$ is not cancelled but is estimated and therefore compensated for in order to obtain an estimate of the BEMF that is not corrupted by the presence of the residual voltage. The compensation takes place through a process of linearization of the transfer function between residual voltage and current through the load.

It is observed that this solution involves the conversion of the residual voltage $V_O$, capable of taking on rather high values if sampled close to the end of TON. One could use an ADC converter having a broad operational range in order to sample such high values, but such a converter would increase the cost of that converter and therefore of the final application.

The document U.S. Pat. No. 7,215,094 B2 describes a solution aiming to cancel the residual voltage $V_O$ by making the discharge phase of the residual voltage faster so as to be able to reduce the cutoff phase TOFF of the discontinuous control.

Figure 3:
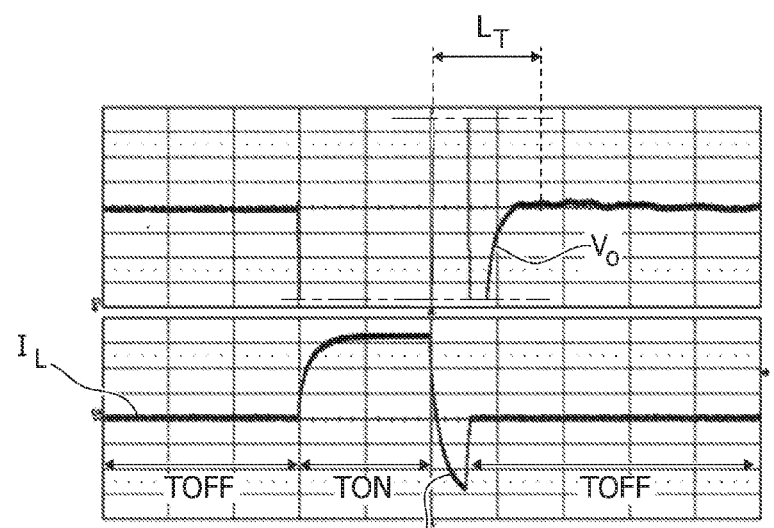

As illustrated in FIG. 3 (in which, as in the case of FIG. 2, the bottom graph exemplifies a possible pattern of the current $I_L$ through the load L and the top graph a possible corresponding pattern of the residual voltage $V_O$), the solution of U.S. Pat. No. 7,215,094 B2 provides for interposing before the start of the cutoff phase TOFF a current pulse of opposite polarity (reverse current pulse—RCP) to that generated during the conduction phase TON.

The graph of FIG. 3 also makes reference to a situation for which the load (i.e., the VCM) is hypothesized to be intentionally blocked so as not to generate movement (and therefore BEMF) so as to highlight a possible pattern of the voltage across the load without the BEMF component. As already stated, this is a hypothetical situation purely for illustrative purposes, and not intended to arise during normal operation of the actuator.

In solutions such as that exemplified in FIG. 3, as a result of the application of the pulse RCP, the residual voltage $V_O$ will be subject to a sudden rise followed by a sudden fall followed by, once the current $I_L$ through the load L is exhausted, a gradual return to zero.

It is observed that, although able to be considered satisfactory (for example, with a reduction of the latency time $L_T$), the solution of U.S. Pat. No. 7,215,094 B2 includes the use of a current pulse (for example, RCP) having a certain duration (reverse current pulse time) which, at least in some cases, can be considered a limitation.

One or more embodiments aim to reduce the duration of the cutoff phase of the power stage and hence the latency between the end of the conduction phase TON and the sampling of the voltage across the load.

One or more embodiments can provide for, as in the case of U.S. Pat. No. 7,215,094 B2, the use of a current pulse RCP with an opposite polarity to that generated during the conduction phase, but of shorter duration than that provided through the solution of U.S. Pat. No. 7,215,094 B2.

Unlike that which occurs in the document U.S. Pat. No. 7,215,094 B2, in which the current pulse RCP exhibits characteristics (amplitude and duration) aiming to cancel the residual voltage $V_O$, one or more embodiments can instead provide for the current pulse RCP to aim at causing an oscillation (and not yet the cancellation) of the residual voltage $V_O$ after the current $I_L$ has been exhausted.

Figure 4:
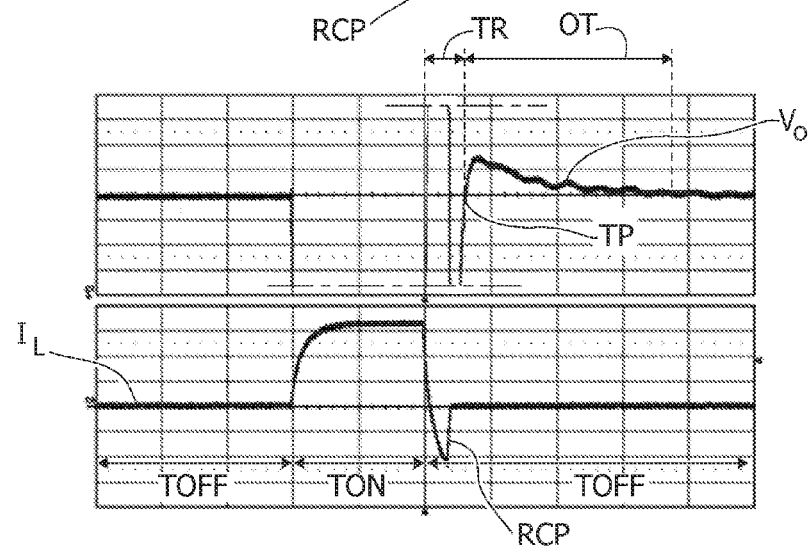

In one or more embodiments, as exemplified in FIG. 4, as result of the application of the pulse RCP (shorter than the case of FIG. 3), the residual voltage $V_O$ becomes again subject to a sudden rise followed by a sudden fall followed by an oscillation such that the residual voltage $V_O$ exhibits, once the current $I_L$ through the load L is exhausted, a (first) zero point (zero-crossing) capable of being used as a sampling instant TP of the voltage across the load L (for example, under the control of the circuit 10); since, at such a zero point, the "disturbance" represented by the residual voltage $V_O$ is cancelled (zero-crossing), the voltage measured at this point turns out to be equal to the BEMF voltage only.

The graph of FIG. 4 also makes reference to a situation, not intended to arise during normal operation of the actuator, in which the load L (for example, the VCM motor) is hypothesized to be intentionally blocked so as not to generate movement (and therefore BEMF); thus, the aforementioned zero-crossing by the residual voltage $V_O$ (i.e., the cancelling of this voltage) can be presented simply as a normal crossing of the horizontal axis of the graph.

As exemplified in FIG. 4 (in which, again, the bottom graph exemplifies a possible pattern of the current $I_L$ through the load L and the top graph a possible pattern of the corresponding residual voltage $V_O$), in one or more embodiments, the duration of the pulse RCP can be chosen to be shorter (even much shorter) than that of the corresponding pulse of FIG. 3.

In one or more embodiments, the duration of the pulse of FIG. 4 can be set, for example as a function of the characteristics (in general, known) of the load L, so as to produce (only) one oscillation of the residual voltage $V_O$, intended to take on a zero value at a pre-established point (for example, at instant TP) which is also capable of being determined as a function of the characteristics of the load L and being independent of the amplitude of current flowing during the TON phase.

As exemplified in FIG. 4, the abovementioned (first) zero-crossing point at the instant TP after the current $I_L$ through the load L is exhausted can then be followed by an overshoot phase OT, also of a certain length, since the residual voltage $V_O$ tends to become depleted naturally over a fairly long time.

This phenomenon is not however such that the performance of one or more embodiments is affected, since the use of a current pulse RCP of reduced duration leads to the manifestation of a residual voltage zero-crossing point that can be used to sense (sample) the BEMF between an interval TR (of a duration identified by TP) corresponding to a "latency" that is (much) reduced with respect to the end of the TON phase.

It will be appreciated that this corresponds to an improvement of the performance over that which can be obtained for example using the solution of U.S. Pat. No. 7,215,094 B2, both in relation to the reduction in latency between the end of the conduction phase TON and the sampling of the BEMF, and for the efficiency of the system, given that a pulse of shorter duration, therefore of lower energetic content, is used.

In one or more embodiments, the instant TP at which there is the abovementioned zero-crossing (therefore the appropriate instant to proceed with reading the BEMF voltage, where this is free from undesired voltage components) can be identified by means of a calibration procedure.

In general, such a calibration procedure (capable of restoring the instant TP for the sampling of the BEMF) can be based on the criterion of making sure that the BEMF has a known value which is reproduced by varying (increasing) the latency between the end of the pulse RCP and the sampling signal of the converter 16.

Once the sampling point TP is found, at which the voltage measured across the load (resulting from the conversion by the converter 16) is equal to the BEMF (of known value) used for the calibration, this point will be usable as a sampling point, for example for measuring the speed of the VCM according to one or more embodiments.

Figure 5:
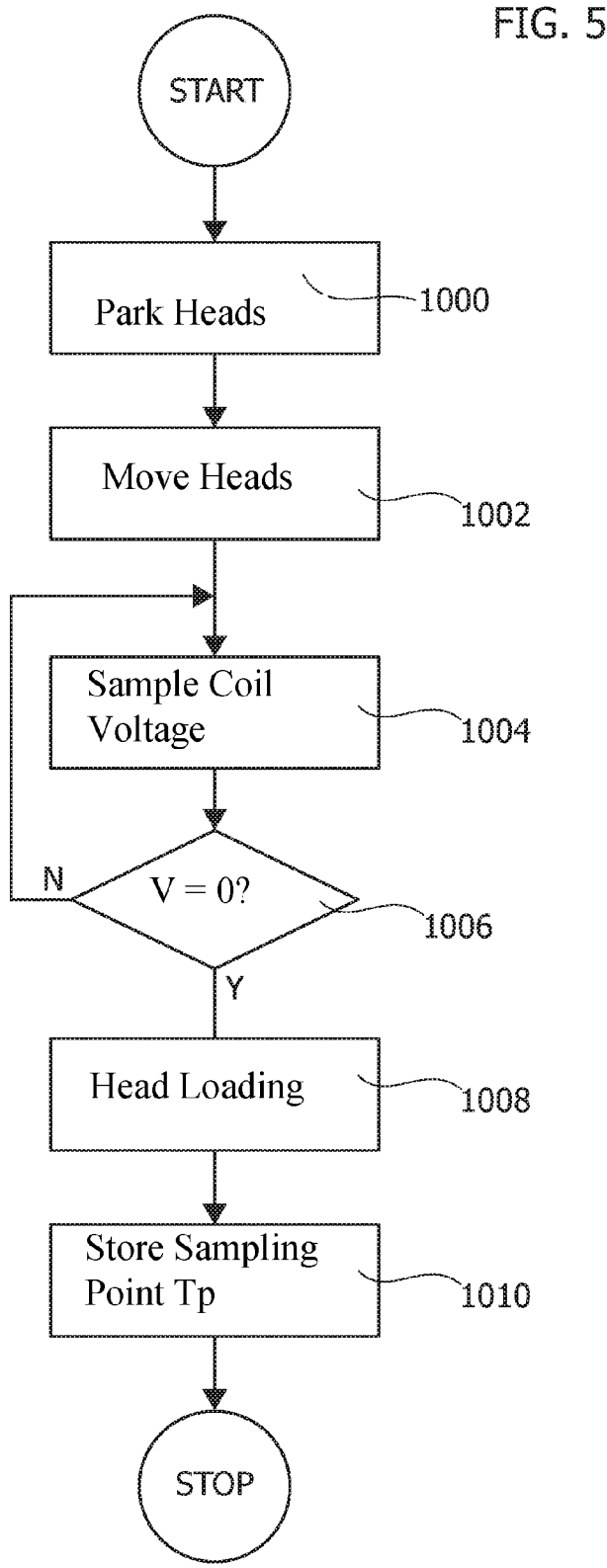
FIG. 5 is an example flow chart of the possible operation of an embodiment, and FIG. 6 further illustrates possible characteristics of embodiments.

The flow chart of FIG. 5 is an example of a calibration procedure in which the known BEMF value is taken to be zero.

This condition (step 1000) can be found and/or obtained in an actuator, such as a VCM of a hard disk drive (HDD), when the heads are parked on the ramp positioned externally to the disks.

In such a parked condition (initial condition upon switching on the hard disk drive), the VCM can only move the heads towards the discs (head loading operation); the heads are at the end of travel, with movement in the opposite direction not being allowed.

To perform the calibration, at step 1002 it is possible to force current pulses in a direction (reverse) so as to force the VCM into the end-of-travel direction and vary the sampling point (step 1004) from the end of the pulse RCP until a voltage is read that is zero or almost zero or in general lower than a pre-established minimum threshold (check conducted at step 1006, the negative exit "N" of which leads to the choice of a new sampling point).

Once the optimal sampling point TP is found (positive exit "Y" of the step 1006), at step 1008 it will be possible to perform the head loading operation according to that indicated by the present description.

The value TP found can be used also for the next parking (unloading) phase since there is little dependency on applicative conditions such as, for example, the temperature of the VCM.

In one or more embodiments, the value TP resulting from the calibration procedure described here purely by way of example can be stored (step 1010) and used at successive times, without needing to perform the calibration before each loading and/or unloading operation.

In one or more embodiments, it is therefore possible to adjust/program the circuit 10 such that at this point it transmits the signal Tc which commands the sampling of the voltage on the load.

Otherwise, it can be assumed that the steps of the flow chart of FIG. 5 can be carried out as part of a control process for the actuator/motor L (for example, a VCM of an HDD unit) executed by the processor circuit 10 according to general criteria that are known per se, and therefore these do not need to be described in detail here.

Figure 6:
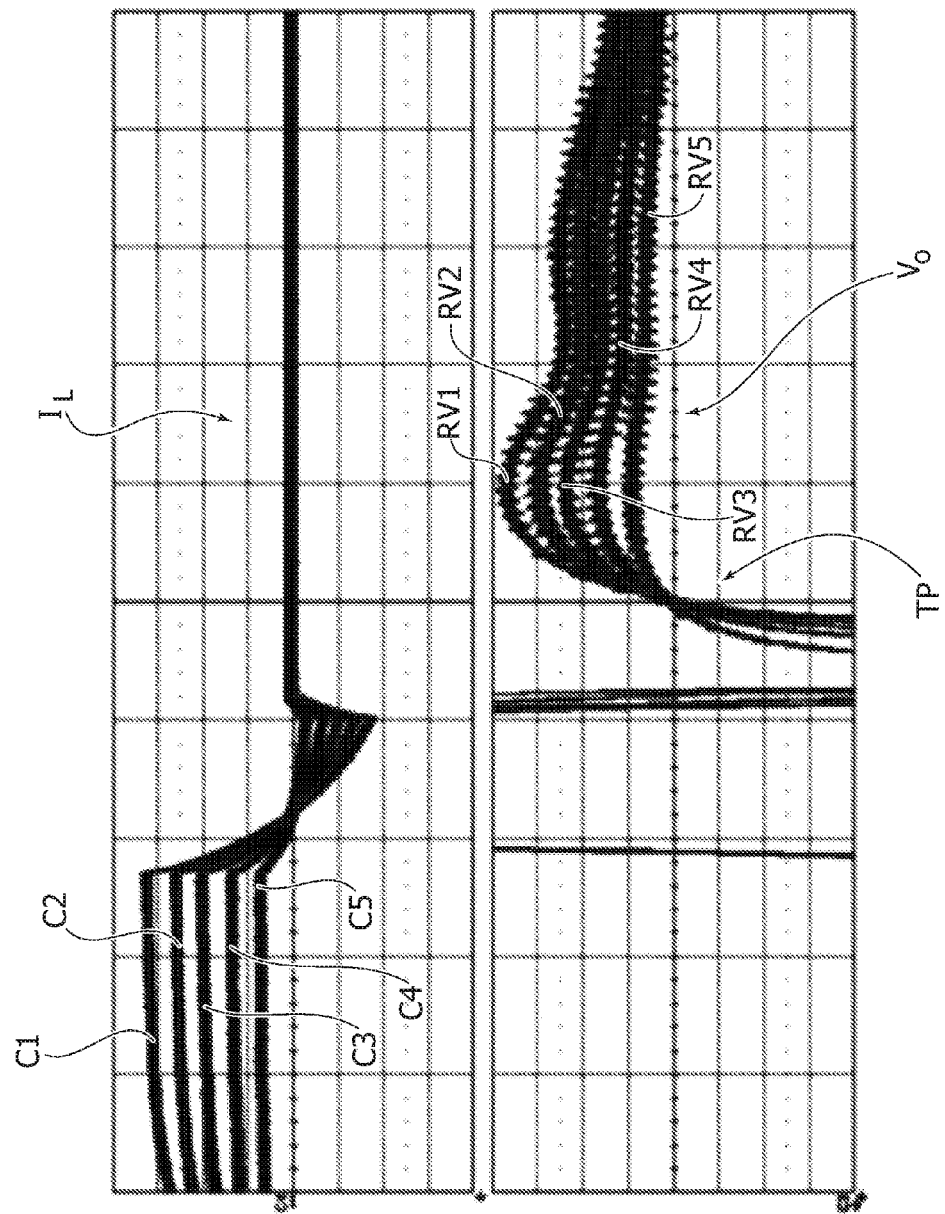

The graph of FIG. 6 presents by way of example possible patterns of the current $I_L$ flowing through the load (load current—top graph) and of the residual voltage $V_O$ that can be sensed across the load (load voltage—bottom graph) in solutions according to one or more embodiments.

FIG. 6 cites the situation for various current intensities C1, C2, C3, C4, C5 used both for the current pulse applied during TON and for the current pulse RCP.

It is possible to observe that the variation in behavior of the corresponding residual voltage, exemplified in FIG. 6 by the curves RV1, RV2, RV3, RV4, RV5, primarily concerns the amplitude of the overshoot and the discharge time but not the zero-crossing point TP.

In one or more embodiments, the instant TP of sampling of the voltage signal on the load L by the converter 16 (determined for example using the calibration procedure described previously) can in practice correspond to the crossover point of two or more curves, such as the curves RV1, RV2, RV3, RV4, RV5 corresponding to various current intensity values C1, C2, C3, C4, C5. This instant can therefore be said to be substantially independent of the value of the current $I_L$, being identified primarily by the oscillation characteristics of the circuit comprising the load (i.e., the winding(s) of the actuator/motor L) and by the duration of the negative pulse RCP.

One or more embodiments can therefore relate to a method for sensing back electromotive force (BEMF) in a winding (for example, L) of an electro-mechanical actuator, such as for example the VCM of an HDD, driven (for example, 10, 12) in a discontinuous mode by alternating conduction on-phases (for example, TON) to off-phases (for example, TOFF) and sensing a voltage across the winding in an off-phase, wherein during said off-phase the voltage across the winding includes a residual voltage (for example, $V_O$) which decays to a zero value over time, wherein the method includes:

driving the winding from an on-phase to an off-phase by applying to the winding a reverse current pulse (for example, RCP) to invert the direction of flow of the current (for example, $I_L$) through the winding and produce an oscillation of said residual voltage, whereby said decaying to a zero value includes a (first) zero-crossing point (for example, TP) after the current ($I_L$) through the winding (L) is exhausted—i.e., after the current $I_L$ is substantially cancelled as a result of the cutoff action during the off-phase, and sensing (for example, 14, 16) the voltage across the winding at said zero-crossing point of the residual voltage, whereby the voltage sensed across the winding at said zero-crossing point is indicative of the back electromotive force of the winding.

One or more embodiments can include applying to the winding during said conduction on-phases a current which is a function of the sensed back electromotive force.

In one or more embodiments, the electro-mechanical actuator can be configured for moving the read/write heads of a hard disk.

One or more embodiments can relate to a driver device that can be coupled to a winding of an electro-mechanical actuator, the device including:

a power stage configured for driving the winding in a discontinuous mode by alternating conduction on-phases to off-phases, a sensor circuit configured for sensing a voltage across the winding in an off-phase, wherein during said off-phase the voltage across the winding includes a residual voltage decaying to a zero value over time, wherein the device includes:

the power stage configured for driving the winding from an on-phase to an off-phase by applying to the winding a reverse current pulse to invert the direction of flow of the current through the winding and produce an oscillation of the residual voltage, whereby said decaying to a zero value includes a zero-crossing point after the current through the winding is exhausted, and the sensor circuit configured for sensing the voltage across the winding at said zero-crossing point of the residual voltage, whereby the voltage sensed across the winding at said zero-crossing point is indicative of the back electromotive force of the winding.

One or more embodiments can include a control circuit coupled to the power stage and to the sensor circuit, and configurable for activating the sensor circuit at a certain time (see for example, the interval TR in FIG. 4) after applying to the winding the reverse current pulse.

In one or more embodiments, the control circuit can be configured for applying to the winding via the power stage during said conduction phases a current which is a function of the back electromotive force sensed via the sensor circuit.

In one or more embodiments, the sensor circuit can include an analogue-to-digital converter (for example, 16) for sampling the voltage across the actuator winding.

In one or more embodiments, an apparatus (for example, 100) can include:
an electro-mechanical actuator including a winding; and
a device according to one or more embodiments, coupled with the electro-mechanical actuator with the power stage of the device coupled to the actuator winding to apply a drive current through the winding, and the sensor circuit of the device coupled to the actuator winding to sense the voltage across the winding.

In one or more embodiments, the apparatus can include a hard disk drive having read/write heads, the read/write heads being moved by the electro-mechanical actuator.

The underlying principles remaining the same, the details and forms of embodiment may be varied, even significantly, with respect to those described here, purely by way of example.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
driving an electro-mechanical actuator in a discontinuous mode by alternating conduction on-phases to off-phases, wherein during each off-phase a voltage across a winding of the electro-mechanical actuator includes a residual voltage decaying toward a zero value over time, wherein the driving includes:
driving the winding from one of the on-phases to one of the off-phases by applying to the winding a reverse current pulse that inverts a direction of flow of a current through the winding and produces an oscillation of said residual voltage wherein said residual voltage includes a zero crossing point after the current in the winding is exhausted, and
sensing the voltage across the winding at said zero crossing point of the residual voltage, wherein the voltage across the winding sensed at said zero crossing point is indicative of a back electromotive force of the winding.

2. The method of claim 1, including applying to said winding, during said conduction on-phases, a current which is a function of the sensed back electromotive force.

3. The method of claim 1, wherein the electro-mechanical actuator moves read/write heads of a hard disk.

4. The method of claim 1, wherein the sensing includes sensing the voltage across the winding at a fixed time after applying to the winding the reverse current pulse.

5. The method of claim 4, comprising applying to the winding, during said conduction on-phases, a current which is a function of the sensed back electromotive force.

6. The method of claim 1, wherein the sensing includes sampling the voltage across the actuator winding using an analog-to-digital converter.

7. A driver device coupleable to a winding of an electro-mechanical actuator, the device including:
a power stage configured to drive the winding in a discontinuous mode by alternating conduction on-phases to off-phases, and
a sensor circuit configured to sense a voltage across the winding in an off-phase, wherein during said off-phase the voltage across the winding includes a residual voltage decaying to a zero value over time, wherein:
the power stage is configured to drive the winding from one of the on-phases to one of the off-phases by applying to the winding a reverse current pulse to invert the direction of flow of the current through the winding and produce oscillation of said residual voltage wherein said residual voltage includes a zero crossing point after the current in the winding is exhausted, and
the sensor circuit is configured to sense the voltage across the winding at said zero crossing point of the residual voltage, wherein the voltage across the winding sensed at said zero crossing point is indicative of a back electromotive force of the winding.

8. The device of claim 7, including a control circuit coupled to the power stage and the sensor circuit, the control circuit being configured to activate the sensor circuit at a fixed time after applying to the winding the reverse current pulse.

9. The device of claim 8, wherein the control circuit is configured to apply to the winding via the power stage, during said conduction on-phases, a current which is a function of the back electromotive force sensed via the sensor circuit.

10. The device of claim 7, wherein the sensor circuit includes an analog-to-digital converter for sampling the voltage across the actuator winding.

11. An apparatus, comprising:
an electro-mechanical actuator including a winding; and
a device coupled with the electro-mechanical actuator, the device including:
a power stage configured to drive the winding in a discontinuous mode by alternating conduction on-phases to off-phases, and
a sensor circuit configured to sense a voltage across the winding in an off-phase, wherein during said off-phase the voltage across the winding includes a residual voltage decaying to a zero value over time, wherein:
the power stage is configured to drive the winding from one of the on-phases to one of the off-phases by applying to the winding a reverse current pulse to invert the direction of flow of the current through the winding and produce oscillation of said residual voltage wherein said residual voltage includes a zero crossing point after the current in the winding is exhausted, and
the sensor circuit is configured to sense the voltage across the winding at said zero crossing point of the residual voltage, wherein the voltage across the winding sensed at said zero crossing point is indicative of a back electromotive force of the winding
the power stage is coupled with the actuator winding to apply a drive current through the winding, and
the sensor circuit is coupled with the actuator winding to sense a voltage across the winding.

12. The apparatus according to claim 11, comprising a hard disk drive having read/write heads, the electro-mechanical actuator being configured to move the read/write heads.

13. The apparatus of claim 12, wherein the driver device includes a control circuit coupled to the power stage and the sensor circuit, the control circuit being configured to activate the sensor circuit at a fixed time after applying to the winding the reverse current pulse.

14. The apparatus of claim 13, wherein the control circuit is configured to apply to the winding via the power stage, during said conduction on-phases, a current which is a function of the back electromotive force sensed via the sensor circuit.

15. The apparatus of claim 12, wherein the sensor circuit includes an analog-to-digital converter for sampling the voltage across the actuator winding.

* * * * *